United States Patent
Tian et al.

(10) Patent No.: US 11,620,179 B1
(45) Date of Patent: Apr. 4, 2023

(54) METHOD, APPARATUS, DEVICE, STORAGE MEDIUM AND PROGRAM PRODUCT FOR LOG INFORMATION PROCESSING

(71) Applicant: BEIJING BYTEDANCE NETWORK TECHNOLOGY CO., LTD., Beijing (CN)

(72) Inventors: Zhipeng Tian, Culver City, CA (US); Hengming Dai, Culver City, CA (US); Zhijun Ling, Beijing (CN); Jianqing Zhang, Los Angeles, CA (US); Zhengqin Luo, Los Angeles, CA (US); Xinglang Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/585,434

(22) Filed: Jan. 26, 2022

(30) Foreign Application Priority Data

Nov. 5, 2021 (CN) .......................... 202111304056.2

(51) Int. Cl.
*G06F 11/00* (2006.01)
*G06F 11/07* (2006.01)
*G06F 21/62* (2013.01)

(52) U.S. Cl.
CPC ...... *G06F 11/0775* (2013.01); *G06F 11/0769* (2013.01); *G06F 21/6254* (2013.01)

(58) Field of Classification Search
CPC ............. G06F 11/0775; G06F 11/0769; G06F 21/6254; G06F 21/6227
See application file for complete search history.

(56) References Cited

U.S. PATENT DOCUMENTS

| 10,698,756 | B1* | 6/2020 | Abdelsalam | G06F 11/3072 |
|---|---|---|---|---|
| 10,936,751 | B1* | 3/2021 | Scotney | G06F 40/284 |
| 11,080,423 | B1* | 8/2021 | Kassam-Adams | G16H 15/00 |
| 2011/0093719 | A1* | 4/2011 | Duhaime | G06F 21/6227 713/182 |
| 2017/0185800 | A1* | 6/2017 | Bentley | G06F 16/2282 |

(Continued)

FOREIGN PATENT DOCUMENTS

| CN | 110232290 A | 9/2019 |
|---|---|---|
| CN | 112685771 A | 4/2021 |

(Continued)

*Primary Examiner* — Marc Duncan

(57) ABSTRACT

According to embodiments of the present disclosure, there is provided a method, apparatus, device, storage medium and program product for log information processing. The method comprises: determining a source of a target log in response to a log query request, wherein the log query request indicates that a target user requests to query the target log; determining a log desensitization policy corresponding to the source of the target log, the log desensitization policy being determined based on log registration information associated with the source, the log registration information being used for indicating a physical meaning of a variable item in the target log; and performing, based on service attribute information of the target user, the log desensitization policy and service authority information, desensitization processing on the variable item related to the target user in the target log for providing the target user with a desensitized target log.

9 Claims, 3 Drawing Sheets

(56) References Cited

U.S. PATENT DOCUMENTS

| | | | |
|---|---|---|---|
| 2021/0124800 A1* | 4/2021 | Williams | G06F 40/205 |
| 2021/0124842 A1* | 4/2021 | Raju | G06F 11/3664 |
| 2021/0200751 A1 | 7/2021 | Sriram Vadakattu | |
| 2021/0209251 A1* | 7/2021 | Parthasarathy | G06F 21/602 |
| 2021/0334455 A1* | 10/2021 | Gkoulalas-Divanis | G06F 21/6254 |
| 2022/0035839 A1* | 2/2022 | Andres | G06Q 50/265 |
| 2022/0121772 A1* | 4/2022 | Singh | G06F 21/6227 |
| 2022/0222372 A1* | 7/2022 | Larson | G06F 16/24558 |

FOREIGN PATENT DOCUMENTS

| | | |
|---|---|---|
| CN | 112784298 A | 5/2021 |
| CN | 112835863 A | 5/2021 |

* cited by examiner

METHOD, APPARATUS, DEVICE, STORAGE MEDIUM AND PROGRAM PRODUCT FOR LOG INFORMATION PROCESSING

CROSS-REFERENCE TO RELATED APPLICATIONS

This application claims priority to and the benefit of Chinese Patent Application No. 202111304056.2, filed on Nov. 5, 2021, the disclosure of which is incorporated herein by reference in its entirety.

FIELD

Various implementations of the present disclosure relate to the field of computers, and more particularly, to method, apparatus, device, and computer storage medium for log information processing.

BACKGROUND

For various types of computing applications, log information is important data for system development and maintenance. Generally, the log information is mostly unstructured data, and various types of information may be merged into a log entry.

Since different log demanders are accustomed to importing various types of data into logs, it may result in some business sensitive data being contained in the logs, the transmission of the log information will cause the leakage of these sensitive data. Thus, in actual business, it is necessary to both consider the demands of the log demanders on the log data itself, and consider the problem of the log information carrying the sensitive data, and especially when the log demand is relatively large, how to systematically and efficiently be compatible with the demands of various different log demanders and control log information query access to avoid the leakage of the sensitive data is a technical problem that needs to be resolved urgently.

SUMMARY

In a first aspect of the present disclosure, a method for log information processing is provided. The method comprises: receiving a log query request indicating that a target user requests to query a target log; determining a source of the target log in response to the log query request, the target log being a log that is generated by a preset log software development kit and has a preset structured format, the preset structured format identifying a variable item in the log by a preset structure identifier; determining a log desensitization policy corresponding to the source of the target log, the log desensitization policy being determined based on log registration information associated with the source, the log registration information being used for indicating a physical meaning of the variable item in the target log; and performing, based on business attribute information of the target user, the log desensitization policy and pre-configured business authority information, desensitization processing on the variable item related to the target user in the target log for providing the target user with a desensitized target log.

In a second aspect of the present disclosure, an apparatus for log information processing is provided. The apparatus comprises: a receiving module configured to receive a log query request indicating that a target user requests to query a target log; a first determining module configured to determine a source of the target log in response to the log query request, the target log being a log that is generated by a preset log software development kit and has a preset structured format, the preset structured format identifying a variable item in the log by a preset structure identifier; a second determining module configured to determine a log desensitization policy corresponding to the source of the target log, the log desensitization policy being determined based on log registration information associated with the source, the log registration information being used for indicating a physical meaning of the variable item in the target log; and a processing module configured to perform, based on business attribute information of the target user, the log desensitization policy and pre-configured business authority information, desensitization processing on the variable item related to the target user in the target log for providing the target user with a desensitized target log.

In a third aspect of the present disclosure, an electronic device is provided. The electronic device comprises: a memory and a processor, wherein the memory is used for storing one or more computer instructions, and the one or more computer instructions are executed by the processor to implement the method according to the first aspect of the present disclosure.

In a fourth aspect of the present disclosure, a computer-readable storage medium is provided. The computer-readable storage medium stores one or more computer instructions thereon, wherein the one or more computer instructions are executed by a processor to implement the method according to the first aspect of the present disclosure.

In a fifth aspect of the present disclosure, a computer program product is provided. The computer program product comprises one or more computer instructions, wherein the one or more computer instructions are executed by a processor to implement the method according to the first aspect of the present disclosure.

According to various embodiments of the present disclosure, the demands of various different log business parties may be systematically and efficiently compatible, and log information query access is controlled to avoid the leakage of sensitive data.

BRIEF DESCRIPTION OF THE DRAWINGS

With respect to the following detailed descriptions in conjunction with the accompanying drawings, the above and other features, advantages and aspects of the embodiments of the present disclosure will become more apparent. Throughout the drawings, the same or similar reference numerals refer to the same or similar elements, wherein.

DETAILED DESCRIPTION OF EMBODIMENTS

Figure 1:
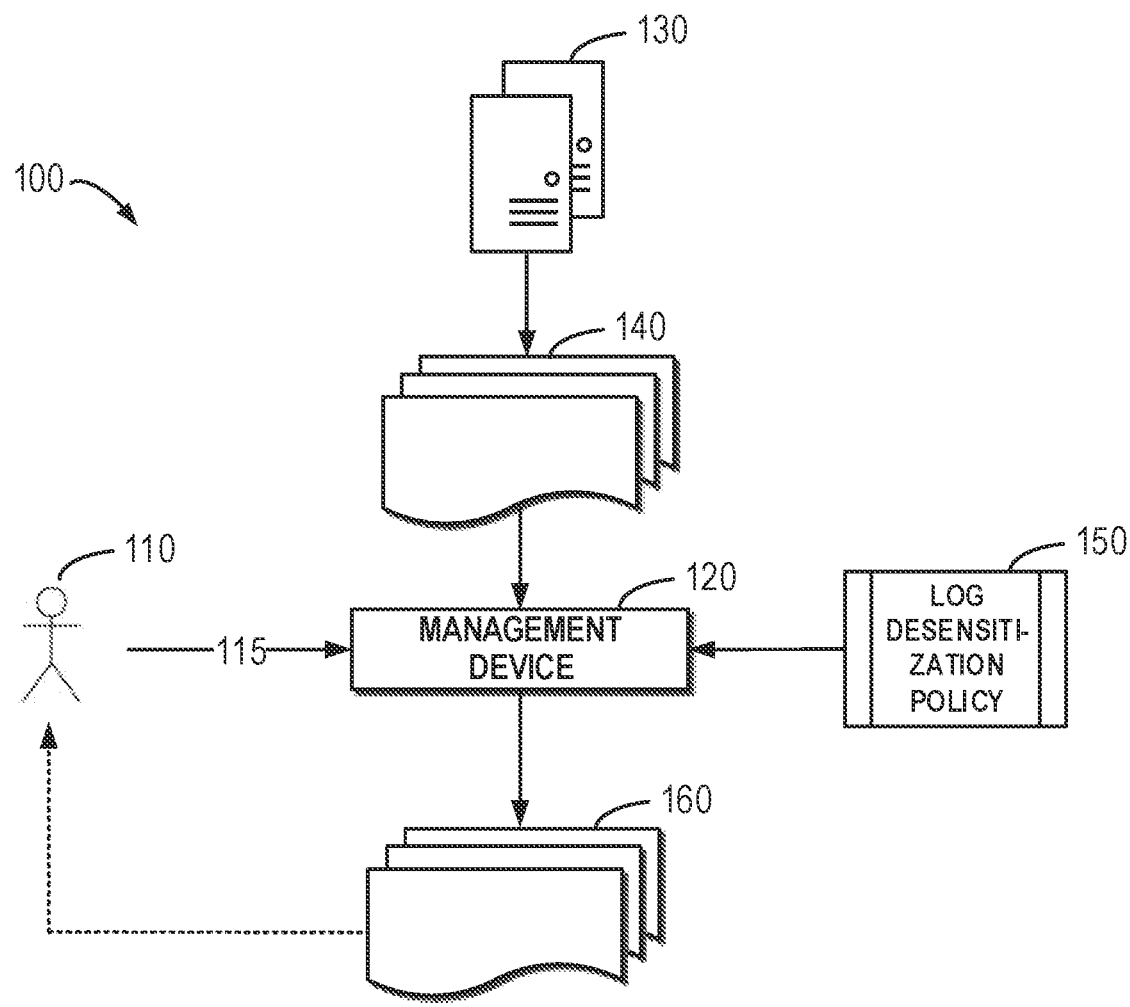
FIG. 1 shows a schematic diagram of an example environment in which a plurality of embodiments of the present disclosure may be implemented.

Hereinafter, the embodiments of the present disclosure will be described in more detail with reference to the drawings. Although some embodiments of the present disclosure are shown in the drawings, it is to be understood that the present disclosure may be implemented in various forms and should not be construed as being limited to the embodiments set forth herein. On the contrary, these embodiments are provided for a more thorough and complete understanding of the present disclosure. It is to be understood that the drawings and embodiments of the present disclosure are only used for exemplary purposes, rather than limiting the protection scope of the present disclosure.

In the description of the embodiments of the present disclosure, the term "includes" and its variants are to be read as open-ended terms that mean "includes, but is not limited to." The term "based on" is to be read as "based at least in part on." The term "one embodiment" or "the embodiment" is to be read as "at least one example embodiment." The terms "first", "second" and so on can refer to same of different objects. The following description may also include other explicit and implicit definitions.

As discussed above, in actual business, it is necessary to both consider the demands of log demanders on log data itself, and consider the problem of log information carrying sensitive data, and especially when the log demand is relatively large. How to systematically and efficiently be compatible with the demands of various different log business parties and control log information query access to avoid the leakage of the sensitive data is a technical problem that is desirable to be resolved urgently.

In order to at least partially solve one or more of the above-mentioned problems and other potential problems, example embodiments of the present disclosure propose a log information processing solution. In general, according to the embodiments described herein, first, a log query request is received. The log query request is used for indicating that a target user requests to query a target log. A source of the target log may be determined in response to the log query request, wherein the target log is a log that is generated by a preset log software development kit (Software Development Kit, SDK) and has a preset structured format, and the preset structured format identifies a variable item in the log by a preset structure identifier. Accordingly, a log desensitization policy corresponding to the source of the target log may be determined. The log desensitization policy is determined based on log registration information associated with the source, and the log registration information is used for indicating a physical meaning of the variable item in the target log. Further, based on business attribute information of the target user, the log desensitization policy and pre-configured business authority information, desensitization processing is performed on the variable item related to the target user in the target log to provide the target user with a desensitized target log.

According to various embodiments of the present disclosure, the generation of the structured log is managed by using the log SDK. The log desensitization policy is determined by using the log registration information, and a log desensitization operation is executed based on the business attribute information of the user, the log desensitization policy and a sensitive data protection file. The embodiments of the present disclosure may be systematically and efficiently compatible with the demands of various different log business parties, and control log information query access to avoid the leakage of sensitive data.

Hereinafter, the embodiments of the present disclosure will be described in detail with reference to the drawings.

FIG. 1 shows a schematic diagram of an example environment 100 in which a plurality of embodiments of the present disclosure may be implemented. In the example environment 100, a log processing device 120 receives a log query request 115, which may indicate a target user 110 to request to check a target log 140.

In some embodiments, the target user 110 may be, for example, an application developer or maintainer, who may initiate a request to check various types of logs generated during a running or debugging process of a program code.

As shown in FIG. 1, the target log 140 may be generated, for example, by a running device 130 during the process of running the program code. In some embodiments, in order to ensure the security of log information, the target log 140 generated by the running device 130 directly cannot be directly accessed, for example, by the target user 110.

In some embodiments, the target log 140 may be, for example, a log that is generated by a preset log software development kit and has a preset structured format. The preset structured format identifies variable items in the log by a preset structure identifier.

Exemplarily, the running device 130 may be deployed, for example, in an environment of a trusted technology partner, so that the target user 110 cannot directly access the target log generated by the running device 130.

In some embodiments, the trusted technology partner may also provide, for example, the target user 110 with the log processing device 120 that can be accessed via a network. The log processing device 120 may be, for example, a gateway device managed by the trusted technology partner.

As will be described in detail below, the log processing device 120 may determine a source of the target log 140 and acquire a log desensitization policy 150 corresponding to the source. In some embodiments, the log desensitization policy 150 may be determined based on log registration information associated with the source. The log registration information may be used for indicating physical meanings of the variable items in the target log 140.

Further, the log processing device 120 may perform desensitization processing on the target log 140 based on the log desensitization policy 150. Exemplarily, the log processing device 120 may provide the target user 110 with a desensitized target log 160.

Figure 2:
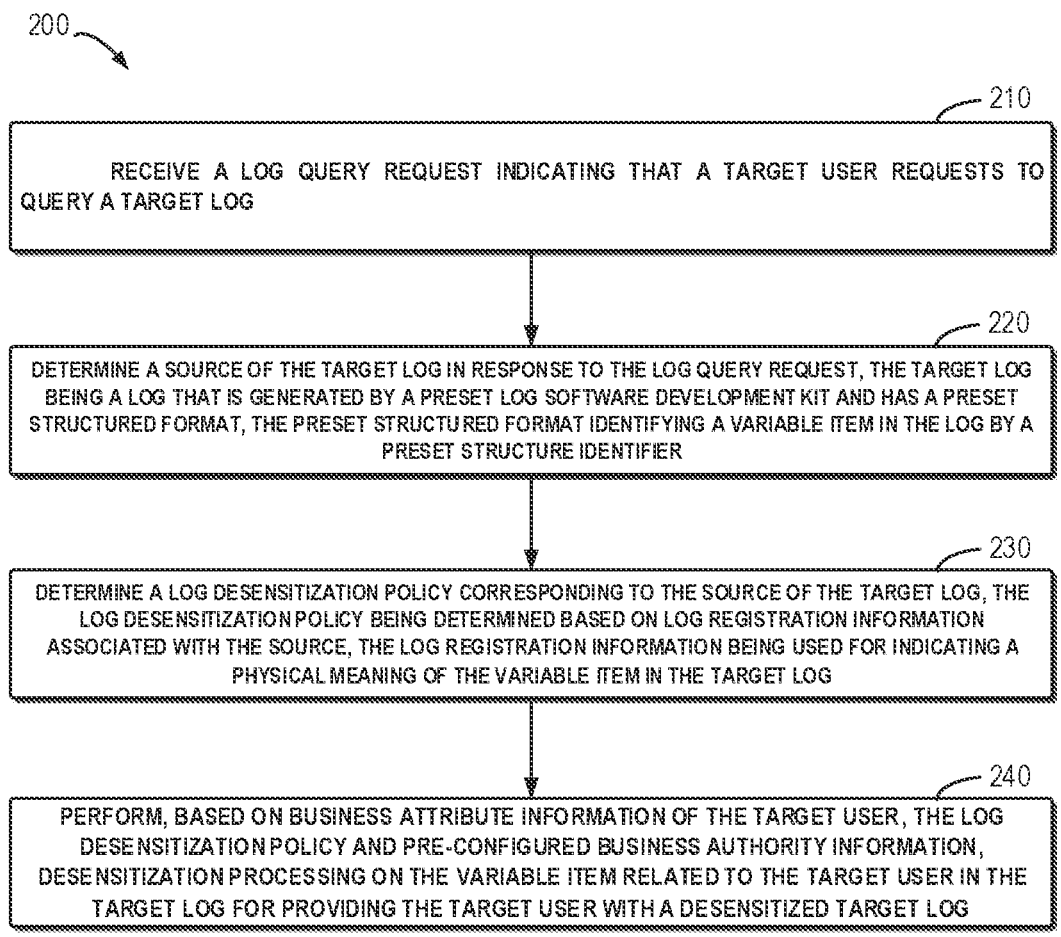
FIG. 2 shows a flow diagram of an example process of log information processing according to some embodiments of the present disclosure.

A log management process of the log processing device 120 will be described in detail below in conjunction with FIG. 2. FIG. 2 shows a flow diagram of an example process 200 of log information processing according to some embodiments of the present disclosure. The process 200 may be implemented, for example, at the log processing device 120 in FIG. 1.

As shown in FIG. 2, at block 210, the log processing device 120 receives the log query request 115, wherein the log query request is used for indicating that the target user 110 requests to query the target log 140.

In some embodiments, the log processing device 120 may receive, for example, the log query request 115 from the target user 110 via a dedicated gateway device. In some embodiments, the log query request 115 may protect, for example, a user identifier of the target user 110.

At block 220, the log processing device 120 determines the source of the target log 140 in response to the log query request 115. The target log 140 is a log that is generated by the preset log software development kit SDK and has the preset structured format, and the preset structured format identifies the variable items in the log by the preset structure identifier. The preset structure identifier may include a specific symbol or character used for indicating that corresponding log content is a variable item.

In some embodiments, the source of the target log 140 is used for indicating the attribution of a code file that generates the target log 140. For example, some code files that generate logs may be from a third-party underlying framework. Accordingly, the source of such logs may be determined as a specific underlying framework, such as the Kite development framework.

As another example, some code files that generate the logs may be developed by business parties. Accordingly, the source of such logs may be determined as a specific business party.

In some embodiments, the log processing device 120 may determine the type of the target log 140 based on a compilation path associated with the target log 140. The type indicates that the target log belongs to a framework type log or a business type log. The framework type log is a log generated by the running of an underlying framework code, and the business type log is a log generated by the running of a business type logic code.

In some embodiments, considering the compilation characteristics of framework type code files and business type code files, the compilation path of the code file that generates the target log may indicate that such code file belongs to the framework type code files or the business type code files.

Specifically, the log processing device 120 may extract respective compilation path from the content of the target log 140, and further determine whether the target log belongs to the framework type log or the business type log.

Further, the log processing device 120 may determine the source of the target log from the target log 140 based on the determined type. The source indicates the underlying framework or the business party that generates the target log 140.

Specifically, in accordance with a determination that the target log 140 is a framework type log, the log processing device 120 may determine, from the compilation path of the target log 140, a framework identifier as the source of the target log 140. In addition, in accordance with a determination that the target log 140 is a business type log, the log processing device 120 may determine, from the target log 140, a service name as the source of the target log 140.

In some embodiments, in order to improve the reliability of log information processing, before determining the source of the target log 140, the log processing device 120 may also perform various types of verification.

In some embodiments, the log processing device 120 may determine the format of the target log. Only in the situation that it is determined that the format conforms to a predetermined specification, the log processing device 120 determines the source of the target log 140 from the target log 140. On the contrary, if it is determined that the format of the target log 140 does not meet the predetermined specification, the log processing device 120 may consider that the target log 140 should not be revealed, and thus refuse to provide the target log 140.

In some embodiments, the log processing device 120 may determine a content format of the target log 140 in response to the log query request 115. Further, in accordance with a determination that the content format of the target log 140 conforms to a predetermined format specification, the log processing device 120 may determine a service source of the target log. In some embodiments, the predetermined format specification may indicate that the log content comprises a service name, a compilation path, a code version number and a preset structure identifier.

In some embodiments, the log processing device 120 may also determine version information of the target log 140. For example, the log processing device 120 may determine the code version number from the target log 140. If it is determined that the version information indicates that the target log 140 is generated by using the predetermined log software development kit, then the log processing device 120 may further determine the source of the target log 140.

On the contrary, if it is determined that the version information indicates that the target log 140 is not generated by using the predetermined log SDK, then the log processing device 120 may consider that the target log 140 should not be revealed, and thus refuse to provide the target log 140.

At block 230, the log processing device 120 determines the log desensitization policy 150 corresponding to the source of the target log 140, wherein the log desensitization policy 150 is determined based on the log registration information associated with the source. The log registration information is used for indicating the physical meanings of the variable items in the target log 140.

Exemplarily, a developer or an operator may submit, for example, the log registration information through a log registration platform provided by the trusted technology partner to register content that can be revealed in logs generated by different sources, such as variables or predetermined character strings. Further, the trusted technical party may audit, for example, the log registration information to determine content that can be checked in the log, so as to form the log desensitization policy 150 corresponding to the source.

In some embodiments, for the framework type log and the business type log, the content of the variable item allowed to be registered may be different. Exemplarily, in accordance with a determination that the type indicates that the target log 140 is a framework type log, the log processing device 120 may determine the log desensitization policy corresponding to the underlying framework based on the framework type indicated by the source, wherein the log desensitization policy at least indicates a first group of variable items allowed to be revealed in the target log, and first description information about the first group of variable items.

In some embodiments, the first description information may indicate a first variable item type of the first group of variable items. The first variable item type includes one of the following: a character type variable, a Boolean type variable, a floating point type variable or an integer type variable.

In some embodiments, the log registration information may be generated based on a registration request of adding a candidate log registration information entry. The registration request at least indicates identification information and description information corresponding to the candidate log registration information entry. Such description information may include, for example, the type of the variable item and the description information of the physical meaning of the variable item.

Exemplarily, the developer may submit a request of adding the candidate log registration information entry for the Kite development framework through the log registration platform. For example, the developer may submit through the log registration platform the name of the variable item applied for revealing, the type of the variable item and the description information of the physical meaning of the variable item.

Considering that the framework type log usually does not include sensitive information, when the developer registers the variable item that is allowed to be revealed in the framework type log, he can specify that the type of the variable item, for example, may not only include floating point variable and integer variable, but may also include character variable. Therefore, the embodiments of the present disclosure may provide the developer with richer information while ensuring the compliance of the log content.

In some embodiments, considering that a business party log will have a greater probability of contacting sensitive data, the log registration platform may restrict, for example, the types of variable items that are allowed to be revealed in the business party log.

Exemplarily, if it is determined that the type indicates that the target log 140 is a business type log, the log processing device 120 may determine, based on a business party indicated by the source, the log desensitization policy 150 corresponding to the business party.

In some embodiments, similar to the framework type log, the log desensitization policy 150 indicates, for example, a second group of variable items allowed to be viewed in the target log and second description information about the second group of variable items.

In some embodiments, the types of variable items that are allowed to be revealed in the framework type log may be restricted to ensure the compliance of the log content, for example Specifically, the second description information indicates, for example, a second variable item type of the second group of variable items. The second variable item type includes one of the following: a Boolean variable, a floating point variable, or an integer variable, but excludes a character variable.

In some embodiments, the log desensitization policy 150 of the framework type log may also indicate, for example, a character string pattern that is allowed to be revealed in the target log 140, wherein the character string pattern represents at least one group of character strings allowed to be revealed.

Considering that in a process of driving the program to automatically generate the log content, the developer often hopes to acquire richer semantic information to facilitate the interpretation of the log content. Accordingly, the log registration platform may also allow submitting a registration request about the character string pattern by the log registration information, for example.

For example, the developer may create, on the log registration platform, a character string pattern such as "AAA{{Code=d %}}BBB" for the business type log generated for a specific business party, such that, for example, the log content (for example, "AAA{{Code=1}}BBB") conforming to the pattern in the log may be revealed.

In some embodiments, the log registration information submitted on the log registration platform may be provided for, for example, an auditing party for auditing, and after the auditing is passed, the log desensitization policy 150 corresponding to the source is updated accordingly. The log desensitization policy 150 may thus manage which content in a log generated by which source may be revealed in which manner.

In some embodiments, before determining the log desensitization policy 150, the log processing device 120 may also determine whether the source is a whitelist that allows to reveal the log. When it is determined that the source belongs to the whitelist that allows to reveal the log, the log processing device 120 may further determine the log desensitization policy 150 corresponding to the source. On the contrary, the log processing device 120 may consider that the target log 140 should not be revealed, and refuse to provide the target log 140.

At block 240, the log processing device 120 performs desensitization processing on the variable items related to the target user in the target log 140 according to the business attribute information of the target user 110, the log desensitization policy 150 and the pre-configured business authority information to provide the target user 110 with the desensitized target log 160.

In some embodiments, as discussed above, the log processing device 120 may require that the target log 140 is generated by using the predetermined log SDK.

In some embodiments, the target log 140 generated based on the log SDK may comprise, for example, two parts, that is, a first part generated by the log SDK itself, and a second part generated by the framework or the business party by using the log SDK.

Specifically, when the target log 140 is a framework type log, the target log 140 comprises a first part generated by the log software development kit SDK itself and a second part generated by the underlying framework code through the log SDK. When the target log 140 is a business type log, the target log comprises a first part generated by the log SDK itself and a second part generated by the business type logic code through the log SDK.

As can be seen from the log content, the first part is generated by the own code of the log SDK, thus it cannot access real application data. In some embodiments, the log processing device 120 may, for example, make the first part always being provided without considering the log registration information 150 corresponding to the target log 140.

In some embodiments, the log processing device 120 may further divide the second part into a text type log content and a statistical type log content (also referred to as KVS, Key-Values) according to data types included in the second part. The statistical type log content may include, for example, a plurality of key-value pairs.

In some embodiments, for example, when generating the statistical type log content, the log SDK always requires such log content to be organized in a predetermined format. Exemplarily, such content may be expressed as "{{key=value}}", that is, two brackets are used for indicating that in which key-value pair information is included.

Accordingly, the log processing device 120 may recognize whether the second part is the statistical type log content by the format corresponding to a statistical type log. If so, the log processing device 120 may determine target business sensitive data matching the target user 110 according to the business attribute information of the target user 110 and the pre-configured business authority information.

In some embodiments, the business authority information may indicate the range of logs that users with different business attributes may access. Exemplarily, the business authority information may specify the log type allowed to be reviewed by the user of the specific business attribute and/or specific variable items allowed to be reviewed in the log. Thus, the log processing device 120 may determine, based on the business authority information and the business attributes of the target user 110, the logs allowed to be reviewed by the target user 110 and/or the variables allowed to be reviewed in the log.

Further, the log processing device 120 may perform, based on the log desensitization policy 150, the desensitization processing on the variable items of the target business sensitive data in the target log 140. Specifically, the log processing device 120 may determine, for example, a group of target variable items matching the log desensitization policy 150 from the target log 140, and accordingly provide the desensitized target log 160.

Exemplarily, if the log desensitization policy 150 indicates that a variable item "key1" has been approved, then the log processing device 120 may search for the variable item "key1" in the second part, and further judge whether the corresponding value matches a variable item type constraint indicated by the log desensitization policy 150. If so, the log processing device 120 may consider that the variable item "key1" matches the log desensitization policy 150, and makes its corresponding log content, for example, "{{key1=value1}}", be provided for the target user 110 as a desensitized log content.

In addition, if the log processing device 120 determines that the second part is a text type log, then the log processing device 120 may first eliminate, for example, the corresponding content from the second part, based on the format characteristics of the content of the variable items recorded in the log.

For example, if the content of the second part in the target log is "AAA{{Code=2}}BBB", then the log processing device 120 may determine its corresponding character string pattern as "AAA{{ }}BBB" by removing "{{Code=2}}", and may further judge that the character string pattern has been registered and passed the auditing. Accordingly, the log processing device 120 may allow the log content corresponding to the character string pattern to be provided for the target user 110 as the desensitized log content.

Further, for each variable item included in the text type log, the log processing device 120 may analyze each variable item based on a similar process discussed above to determine whether the variable item matches the log desensitization policy 150, thereby controlling the desensitization processing of each variable item.

It is to be understood that, the desensitized target log 160 may be provided in any suitable manner, and examples of which may comprise, but are not limited to providing the desensitized target log 160 by a graphical user interface or an email. The present disclosure is not intended to limit the specific providing manner.

Based on the process discussed above, the generation of the structured log is managed by using the log SDK, the log desensitization policy is determined by using the log registration information, and the log desensitization operation is executed based on the business attribute information of the user, the log desensitization policy and the sensitive data protection file. The embodiments of the present disclosure may be systematically and efficiently compatible with the demands of various different log business parties, and control log information query access to avoid the leakage of sensitive data.

Figure 3:
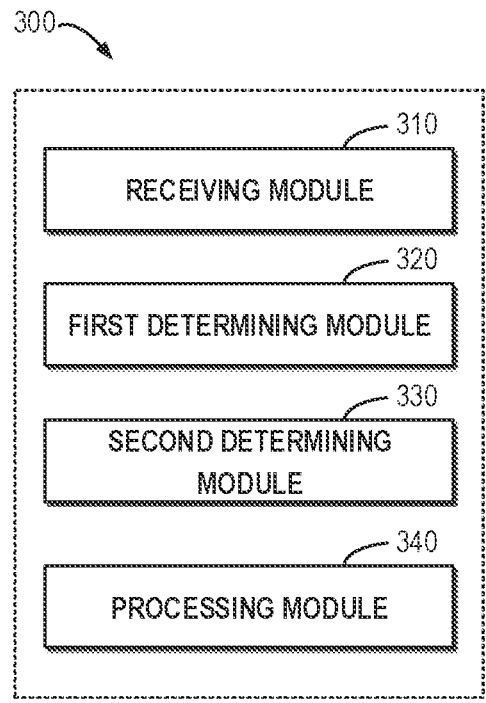
FIG. 3 shows a schematic structural block diagram of a log information processing apparatus according to some embodiments of the present disclosure.

The embodiments of the present disclosure further provide a respective apparatus for implementing the above-mentioned method or process. FIG. 3 shows a schematic structural block diagram of a log information processing apparatus 300 according to some embodiments of the present disclosure.

As shown in FIG. 3, the apparatus 300 may comprise: a receiving module 310 configured to receive a log query request indicating that a target user requests to query a target log; a first determining module 320 configured to determine a source of the target log in response to the log query request, the target log being a log that is generated by a preset log software development kit and has a preset structured format, and the preset structured format identifying a variable item in the log by a preset structure identifier; a second determining module 330 configured to determine a log desensitization policy corresponding to the source of the target log, the log desensitization policy being determined based on log registration information associated with the source, and the log registration information being used for indicating a physical meaning of the variable item in the target log; and a processing module 340 configured to perform, based on business attribute information of the target user, the log desensitization policy and pre-configured business authority information, desensitization processing on the variable items related to the target user in the target log for providing the target user with a desensitized target log.

In some embodiments, the first determining module 320 is further configured to determine a type of the target log based on a compilation path associated with the target log, the type indicating that the target log belongs to a framework type log or a business type log, the framework type log being a log generated by the running of an underlying framework code, and the business type log being a log generated by the running of a business type logic code; in accordance with a determination that the target log is a framework type log, determine a framework identifier from the compilation path of the target log as the source of the target log; and in accordance with a determination that the target log is a business type log, determine a service name from the target log as the source of the target log.

In some embodiments, if the target log is a framework type log, the target log includes a first part generated by the log software development kit SDK itself and a second part generated by ab underlying framework code through the log SDK; or if the target log is a business type log, the target log includes a first part generated by the log SDK itself and a second part generated by a business type logic code through the log SDK.

In some embodiments, the log registration information comprises a type of the variable item in the target log and description information of the physical meaning of the variable item; and the variable item comprises the following types: a character variable, a Boolean variable, a floating point variable or an integer variable.

In some embodiments, the processing module 340 is further configured to: determine business attribute information of the target user according to a user identifier of the target user; determine target business sensitive data matching the target user according to the business attribute information of the target user and the pre-configured business authority information; and perform the desensitization processing on the variable items of the target business sensitive data in the target log based on the log desensitization policy.

In some embodiments, the first determining module is further configured to: determine a content format of the target log in response to the log query request; and in accordance with a determination that the content format of the target log meets a predetermined format specification, determine the source of the target log, wherein the predetermined format specification indicates that a log content comprises a service name, a compilation path, a code version number and the preset structure identifier.

In some embodiments, when the target log is a business type log, the log registration information further includes a set of character strings included in the target log and description information of the physical meanings of the set of character strings.

Figure 4:
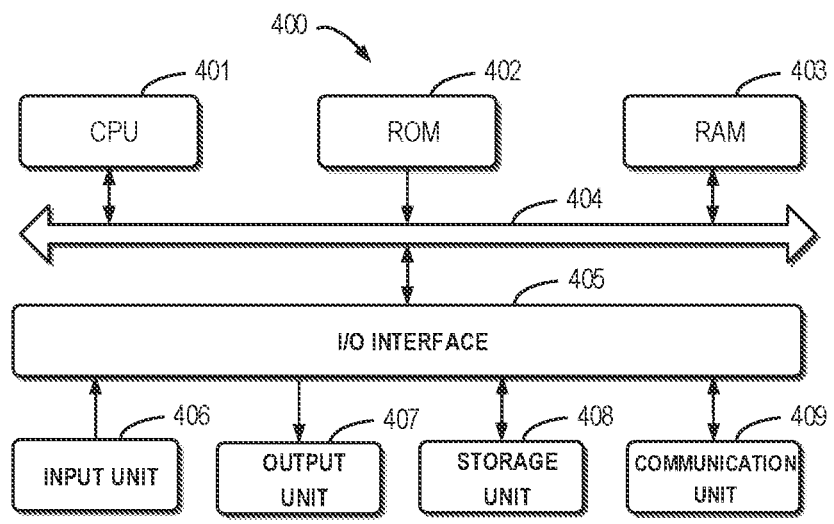
FIG. 4 shows a block diagram of a computing device capable of implementing a plurality of embodiments of the present disclosure.

FIG. 4 shows a schematic block diagram of an example device 400 for implementing the embodiments of the present disclosure. For example, the log processing device 120 and/or the running device 130 according to the embodiment of the present disclosure may be implemented by the device 400. As shown, the device 400 includes a central processing unit (CPU) 401, which may execute various suitable actions and processing according to computer program instructions stored in a read-only memory (ROM) 402 or computer program instructions loaded from a storage unit 408 into a random access memory (RAM) 403. In the RAM 403, various programs and data required for the operation of the device 400 may also be stored. The CPU 401, the ROM 402 and the RAM 403 are connected to each other via a bus 404. An input/output (I/O) interface 405 is also connected to the bus 404.

A plurality of components in the device 400 are connected to the I/O interface 405, including: an input unit 406, such as a keyboard, a mouse and the like; an output unit 407, such as various types of displays and loudspeakers etc.; a storage unit 408, such as a magnetic disk and an optical disk; and a communication unit 409, such as a network card, a modem, a wireless communication transceiver and the like. The communication unit 409 allows the device 400 to exchange information/data with other devices through computer networks such as the Internet and/or various telecommunication networks.

The above described each procedure and processing, for example, the process 200, may be executed by the processing unit 401. For example, in some embodiments, the process 200 may be implemented as a computer software program, which is tangibly contained in a machine-readable medium, such as the storage unit 408. In some embodiments, the computer program can be partially or fully loaded and/or installed on the device 400 via the ROM 402 and/or the communication unit 409. When the computer program is loaded into the RAM 403 and executed by the CPU 401, one or more actions of the process 200 described above may be executed.

The present disclosure may be a method, an apparatus, a system and/or a computer program product. The computer program product may include a computer-readable storage medium loaded with computer-readable program instructions for executing the various aspects of the present disclosure.

The computer-readable storage medium may be a tangible device that may hold and store instructions used by an instruction execution device. The computer-readable storage medium may be, for example, but is not limited to, an electrical storage device, a magnetic storage device, an optical storage device, an electromagnetic storage device, a semiconductor storage device, or any suitable combination of the above devices. More concrete examples of the computer-readable storage medium (non-exhaustive list) include: a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disk (DVD), a memory stick, a floppy disk, a mechanical encoding device, such as a protruding structure in a punched card or a groove on which instructions are stored, and any suitable combination of the above devices. The computer-readable storage medium used herein is not interpreted as transient signals per se, such as radio waves or other freely propagating electromagnetic waves, electromagnetic waves propagating through waveguides or other transmission media (for example, optical pulses transmitted via optical fiber cables), or electrical signals transmitted via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (device) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processor of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable those ordinary skilled in the art to understand embodiments of the present disclosure.

What is claimed is:

1. A method for log information processing, comprising:
   receiving, by a processor of a log processing device, a log query request indicating that a target user requests to query a target log that is generated by a running device in an environment of a trusted technology partner during a running or debugging process of a program code, wherein the target user is prevented from directly accessing the target log generated by the running device, and wherein the target user is provided with the log processing device by the trusted technology partner;
   determining, by the processor of the log processing device, a source of the target log in response to the log query request, the target log being a log that is generated by a preset log software development kit and has a preset structured format, the preset structured format identifying a variable item in the log by a preset structure identifier;
   determining, by the processor of the log processing device, a log desensitization policy corresponding to the source of the target log, the log desensitization policy being determined based on log registration information associated with the source, the log registration information being used for indicating a physical meaning of the variable item in the target log and being submitted through a log registration platform provided by the trusted technology partner to register content that can be revealed in logs generated by different sources; and
   performing, by the processor of the log processing device and based on business attribute information of the target user, the log desensitization policy and pre-configured business authority information, desensitization processing on the variable item related to the target user in the target log for providing the target user with a desensitized target log.

2. The method according to claim 1, wherein determining the source of the target log in response to the log query request comprises:
   determining, by the processor of the log processing device, a type of the target log based on a compilation path associated with the target log, the type indicating that the target log belongs to a framework type log or a business type log, the framework type log being a log generated by running of an underlying framework code, the business type log being a log generated by running of a business type logic code;
   in accordance with a determination that the target log is a framework type log, determining, by the processor of the log processing device, a framework identifier from the compilation path of the target log as the source of the target log; and
   in accordance with a determination that the target log is a business type log, determining, by the processor of the log processing device, a service name from the target log as the source of the target log.

3. The method according to claim 1, wherein,
   if the target log is a framework type log, the target log comprises a first part generated by the log software development kit (SDK) itself and a second part generated by an underlying framework code through the log SDK; or
   if the target log is a business type log, the target log comprises a first part generated by the log SDK itself and a second part generated by a business type logic code through the log SDK.

4. The method according to claim 1, wherein the log registration information comprises a type of the variable item in the target log and description information of the physical meaning of the variable item; and
   the variable item comprises the following types: a character variable, a Boolean variable, a floating point variable or an integer variable.

5. The method according to claim 1, wherein the performing desensitization processing on the variable item related to the target user in the target log according to the business attribute information of the target user, the log desensitization policy and the pre-configured business authority information, comprises:
   determining, by the processor of the log processing device, business attribute information of the target user according to a user identifier of the target user;
   determining, by the processor of the log processing device, target business sensitive data matching the target user according to the business attribute information of the target user and the pre-configured business authority information; and
   performing, by the processor of the log processing device, the desensitization processing on the variable item of the target business sensitive data in the target log based on the log desensitization policy.

6. The method according to claim 1, wherein determining the source of the target log in response to the log query request, comprises:

in response to the log query request, determining, by the processor of the log processing device, a content format of the target log; and in accordance with a determination that the content format of the target log meets a predetermined format specification, determining, by the processor of the log processing device, the source of the target log, wherein the predetermined format specification indicates that a log content comprises a service name, a compilation path, a code version number and the preset structure identifier.

7. The method according to claim 1, wherein, when the target log is a business type log, the log registration information further comprises a set of character strings comprised in the target log, and description information of physical meanings of the set of character strings.

8. An electronic device, comprising:
a memory and a processor,
wherein the memory is used for storing one or more computer instructions, wherein the one or more computer instructions, when executed by the processor, cause the electronic device to:

receive a log query request indicating that a target user requests to query a target log that is generated by a running device in an environment of a trusted technology partner during a running or debugging process of a program code, wherein the target user is prevented from directly accessing the target log generated by the running device, and wherein the target user is provided with the electronic device by the trusted technology partner;

determine a source of the target log in response to the log query request, the target log being a log that is generated by a preset log software development kit and has a preset structured format, the preset structured format identifying a variable item in the log by a preset structure identifier;

determine a log desensitization policy corresponding to the source of the target log, the log desensitization policy being determined based on log registration information associated with the source, the log registration information being used for indicating a physical meaning of the variable item in the target log and being submitted through a log registration platform provided by the trusted technology partner to register content that can be revealed in logs generated by different sources; and perform, based on business attribute information of the target user, the log desensitization policy and pre-configured business authority information, desensitization processing on the variable item related to the target user in the target log for providing the target user with a desensitized target log.

9. A computer-readable storage medium, having one or more computer instructions stored thereon, wherein the one or more computer instructions are executed by a processor of an electronic device to implement a method comprising:

receiving a log query request indicating that a target user requests to query a target log that is generated by a running device in an environment of a trusted technology partner during a running or debugging process of a program code, wherein the target user is prevented from directly accessing the target log generated by the running device, and wherein the target user is provided with the electronic device by the trusted technology partner;

determining a source of the target log in response to the log query request, the target log being a log that is generated by a preset log software development kit and has a preset structured format, the preset structured format identifying a variable item in the log by a preset structure identifier;

determining a log desensitization policy corresponding to the source of the target log, the log desensitization policy being determined based on log registration information associated with the source, the log registration information being used for indicating a physical meaning of the variable item in the target log and being submitted through a log registration platform provided by the trusted technology partner to register content that can be revealed in logs generated by different sources; and performing, based on business attribute information of the target user, the log desensitization policy and pre-configured business authority information, desensitization processing on the variable item related to the target user in the target log for providing the target user with a desensitized target log.

* * * * *